United States Patent
Funk et al.

(10) Patent No.: US 6,324,910 B1
(45) Date of Patent: *Dec. 4, 2001

(54) METHOD AND DEVICE FOR MEASURING A PHYSICAL VARIABLE

(75) Inventors: Karsten Funk, Stuttgart; Hans-Martin Kulcke, Boeblingen; Franz Laermer, Stuttgart; Andrea Schilp, Schwaebisch, Ginuend, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/284,907
(22) PCT Filed: Oct. 15, 1997
(86) PCT No.: PCT/DE97/02353
   § 371 Date: Jun. 22, 1999
   § 102(e) Date: Jun. 22, 1999
(87) PCT Pub. No.: WO98/18011
   PCT Pub. Date: Apr. 30, 1998

(30) Foreign Application Priority Data

Oct. 21, 1996 (DE) .............................. 196 43 342

(51) Int. Cl.[7] .................................. G01H 13/00
(52) U.S. Cl. ................. 73/579; 73/514.16; 73/514.18
(58) Field of Search ........................ 73/504.12, 514.16, 73/504.04, 514.18, 579

(56) References Cited

U.S. PATENT DOCUMENTS

| 4,019,391 | | 4/1977 | Ljung . | |
|---|---|---|---|---|
| 4,805,456 | * | 2/1989 | Howe et al. | 73/DIG. 1 |
| 4,841,775 | * | 6/1989 | Ikeda et al. | 73/704 |
| 5,563,343 | * | 10/1996 | Shaw et al. | 73/514.18 |
| 5,656,778 | * | 8/1997 | Roszhart | 73/504.04 |
| 5,747,690 | * | 5/1998 | Park et al. | 73/504.12 |
| 5,780,740 | * | 7/1998 | Lee et al. | 73/504.12 |
| 5,952,572 | * | 9/1999 | Yamashita et al. | 73/504.04 |
| 6,012,341 | * | 1/2000 | Funk et al. | 73/862.59 |
| 6,067,858 | * | 5/2000 | Clark et al. | 73/504.16 |

FOREIGN PATENT DOCUMENTS

| 36 30 368 | 3/1987 | (DE) . |
|---|---|---|
| 44 24 635 | 1/1996 | (DE) . |
| 196 42 893 | 4/1997 | (DE) . |
| 195 47 184 | 6/1997 | (DE) . |
| 0 786 645 | 7/1997 | (EP) . |
| WO 94 284 27 | 12/1994 | (WO) . |
| WO 96 34255 | 10/1996 | (WO) . |

* cited by examiner

Primary Examiner—Hezron Williams
Assistant Examiner—Nashmiya Fayyaz
(74) Attorney, Agent, or Firm—Kenyon & Kenyon

(57) ABSTRACT

A method for measuring a physical variable in which a structure is put in resonant oscillations and a change in the oscillation frequency of the structure as a result of a change in the physical variable to be measured is detected, and a frequency-analog signal is provided. A structure oscillating with a resonance frequency receives an electrostatic force.

11 Claims, 2 Drawing Sheets

METHOD AND DEVICE FOR MEASURING A PHYSICAL VARIABLE

FIELD OF THE INVENTION

The present invention relates to a method for measuring a physical variable and a device for measuring a physical variable.

BACKGROUND INFORMATION

Methods and devices of this type are known. These include a structure oscillating in resonance, whose swing frequency varies as a result of a change in the physical variable to be measured. The change in the oscillating frequency of the structure is detected using analytical means and results in a frequency-analog signal, from which the magnitude of the influencing physical variable to be measured can be deduced. The structure oscillating in resonance is formed by a spring-mass system, its sensitivity being dependent on the geometric dimensions of the structure oscillating in resonance. In order to analyze the shift in the natural frequency of the oscillating structure, the latter is connected as a frequency-determining element of an electronic oscillator switch. The resolution depends essentially on the signal-noise ratio of the oscillator circuit, and on the frequency measurement method used. As efforts are being made to miniaturize such measuring devices in order to make manufacturing inexpensive, it is a drawback that this entails a reduction in sensitivity or resolution.

SUMMARY OF THE INVENTION

The method according to the present invention and the device according to the present invention offer an advantage in that the measuring sensitivity can be raised even with measuring devices having a small size. Because of the fact that the structure oscillating at its resonance frequency receives an electrostatic force, which preferably acts in the direction of oscillation, it is advantageously possible to influence the sensitivity of the measuring device using the values determining the electrostatic force. Thus an operating point of the measuring device can be advantageously set using the voltage which contributes to determining the electrostatic force, which is applied between the structure oscillating in resonance and the counterstructure assigned to it. The larger the selected voltage, the closer the operating point moves to the point of mechanical instability of the measuring device.

Through the level of the voltage, which remains constant during the measuring procedure, the sensitivity of the measuring device can be set very advantageously. According to the sensitivity set using the voltage, the electrostatic force affecting the structure oscillating in resonance can be varied, using the movably mounted counterstructure, so that as a result of the constant voltage the electrostatic force is dependent solely on the change in spacing.

Because of the change in the spacing between the structure and the counterstructure, which is preferably directly proportional to the variable to be measured, a natural frequency shift of the oscillating structure can be achieved. This natural frequency shift is all the greater, for a given value of the physical variable to be measured, the closer the operating point of the measuring device is set, using the magnitude of the constant voltage, to the point of mechanical instability. Thus even very small changes in the physical variable to be measured result in a relatively high natural frequency shift (resonance frequency shift), which then can be analyzed using evaluation means. In this way even the smallest geometric shifts, that is, changes in the spacing between the structure and the counterstructure, suffice to provoke relevant frequency differences.

In a preferred embodiment of the present invention, the counterstructure giving rise to the electrostatic force is a movably mounted component of a force sensor, in particular an acceleration sensor. Preferably, the structure and the counterstructure are arranged at an angle to one sensing direction of the acceleration sensor. In this way it becomes advantageously possible to reduce a reaction of the electrostatic force on the counterstructure and to increase the overall measuring precision of the measuring device according to the present invention. Furthermore, the angular offset very advantageously makes it possible for a deflection of a seismic mass of the acceleration sensor to be demultiplied so that a more exact measurement is possible.

DETAILED DESCRIPTION

Figure 1:
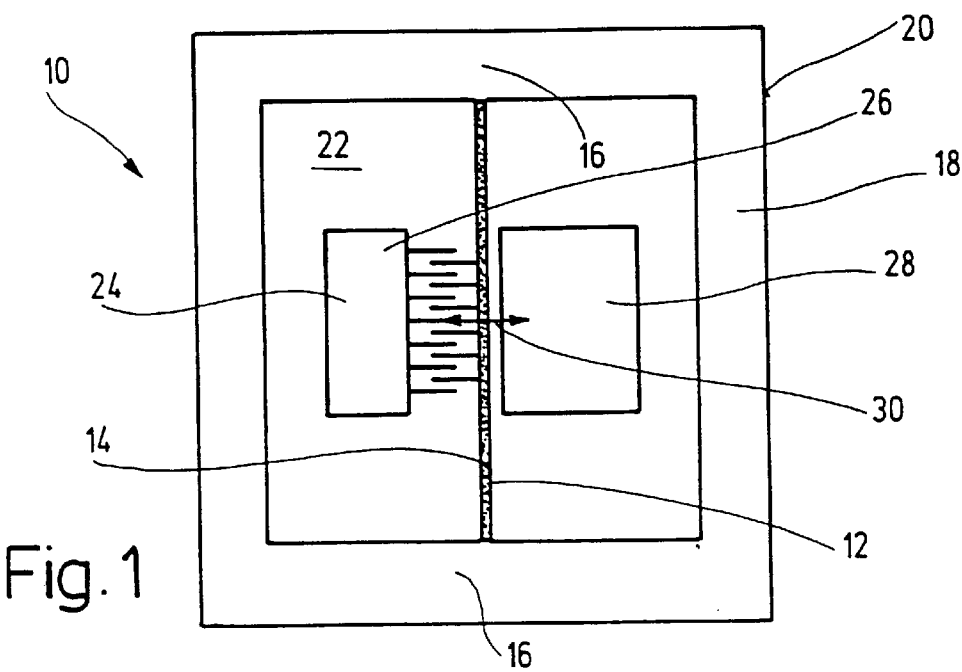
FIG. 1 shows a schematic top view of a basic structure of a measuring device according to the present invention.

FIG. 1 shows a measuring device generically labeled 10. Measuring device 10 is only schematically depicted in a top view and is supposed to elucidate the measuring method according to the present invention. Measuring device 10 has a structure 12, which is formed by a bending beam 14, which is movably fixed between two supports 16. Supports 16 can be components of a frame 18, which is a component of a substrate 20 not depicted here in detail. Bending beam 14 spans a window 22 formed by frame 18. A drive mechanism 24, which is formed, for example, by an electrostatic comb drive 26, is assigned to structure 12. Drive mechanism 24 further has an electronic oscillator switch not shown here in detail. A counterstructure 28 is moreover assigned to structure 12, which is arranged on the side of bending beam 14 opposite drive mechanism 24. Counterstructure 28 is movably supported in the oscillation direction, labeled here with a double arrow 30, of bending beam 14. Both structure 12 and counterstructure 28 are connected to a direct current source in a manner not shown in FIG. 1, structure 12 being connected to the negative pole or the ground of the direct current source and counterstructure 28 being connected to the positive pole of the direct current source, or vice versa (polarity is unimportant).

Measuring device 10 shown in FIG. 1 performs the following functions:

Using drive mechanism 24, structure 12 is put into resonant oscillation with a resonance frequency $f_0$ (without external load) in its oscillation direction 30. If an external physical variable impacts now on this structure 12 (bending beam 14) oscillating at resonance frequency $f_0$, for example, an acceleration or a pressure, mechanical stresses are injected into structure 12, which result in a natural frequency shift of resonance frequency f with which structure 12 oscillates. By detecting the frequency shift between resonance frequency f and resonance frequency $f_0$, the magnitude of the impacting physical variable can be derived by a frequency-analog measuring method. The sensitivity of the measuring method depends on the geometric dimensions of structure 12. For the pure bending oscillation of bending beam 14, the following applies:

$$f = f_0 \cdot \sqrt{1 - \frac{3 \cdot F}{\pi^2 \cdot E} \cdot \frac{l^2}{b^3 \cdot h}}$$

with resonance frequency $f_0$ being calculated as follows:

$$f_0 = \frac{4.73^2 \cdot b}{2 \cdot \pi \cdot l^2} \cdot \sqrt{\frac{E}{12 \cdot \zeta}}$$

Resonance frequency $f_0$ applies to the unloaded state of structure 12. F is the force applied to structure 12, E is the modulus of elasticity, and $\zeta$ is the density of the material used (material constant) of bending beam 14. The length is given by l, width in oscillation direction 30 by b, and height of bending beam 14 by h.

By connecting structure 12 and counterstructure 28 with the direct current source, an electrostatic force $F_E$ is exerted by counterstructure 28 on structure 12 oscillating in the rest state with resonance frequency $f_0$. Through the impact of electrostatic force $F_E$ on structure 12, the oscillating behavior can be influenced in a targeted manner. In this, electrostatic force $F_E$ is calculated according to:

$$F_E = \frac{1}{2} \cdot \varepsilon \cdot h_E \cdot \frac{U^2}{d^2}$$

$\varepsilon$ designates here the electricity constant, $l_E$ the length of counterstructure 28, $h_E$ the height of counterstructure 28, which is directly opposite structure 12. The voltage applied between structure 12 and counterstructure 28 is labeled U, while d designates the spacing between structure 12 and counterstructure 28.

The mechanical elastic force of structure 12 (bending beam 14), which contributes to determining the resulting resonance frequencies f, is superimposed by electrostatic force $F_E$, so that the effective spring constant $c_{\it eff}$ of structure 12 changes. This change in the effective spring constant reacts on resonance frequency f, with the following equation being applicable:

$$f = f_0 \cdot \sqrt{\frac{c_{\it eff}}{c_0}}$$

The effective spring constant $c_{\it eff}$ at a voltage U=0 is designated by $c_0$.

Overall, therefore, it results that electrostatic force F and thus resonance frequency f of structure 12 can be influenced by the magnitude of two variables: voltage U and spacing d. Structure 12 and counterstructure 28 virtually form a condenser, with structure 12 and counterstructure 28 representing the condenser plates. The other variables, such as length l, width b, and height h of structure 12, and length $l_E$ and height $h_E$ of counterstructure 28 are predetermined by the design of measuring device 10 and fixed.

Figure 2:
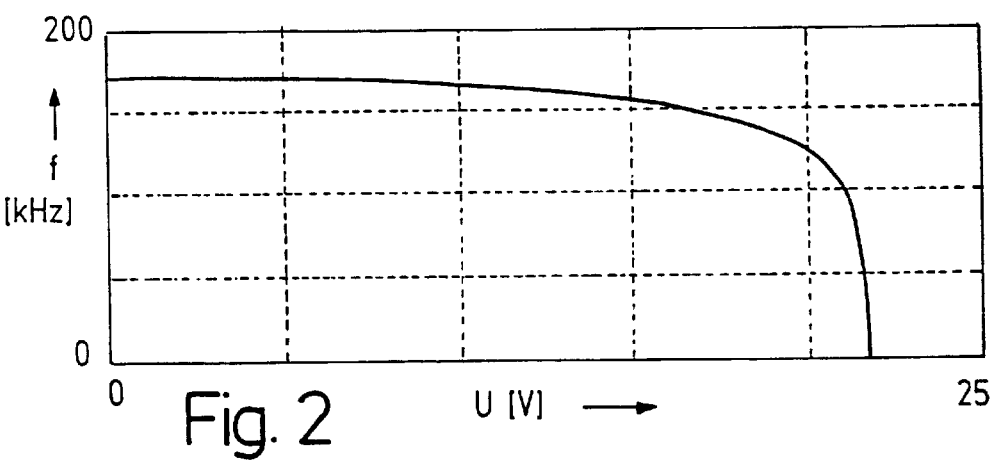
FIG. 2 shows a frequency-voltage characteristic curve of the device according to FIG. 1.

FIG. 2 shows the resonance frequency-voltage characteristic curve of measuring device 10 with an assumed fixed spacing d between structure 12 and counterstructure 28. It becomes clear that resonance frequency f drops with increasing voltage U. An operating point of measuring device 10 can be set through voltage U, especially a spacing between the operating point and a point of mechanical instability of structure 12 of measuring device 10. The closer the operating point is placed to the point of mechanical instability, the more the sensitivity of measuring device 10 can be increased, because here even minute deviations of resonance frequency f can result in a greater signal deviation because of an externally impacting physical variable to be measured.

Figure 3:
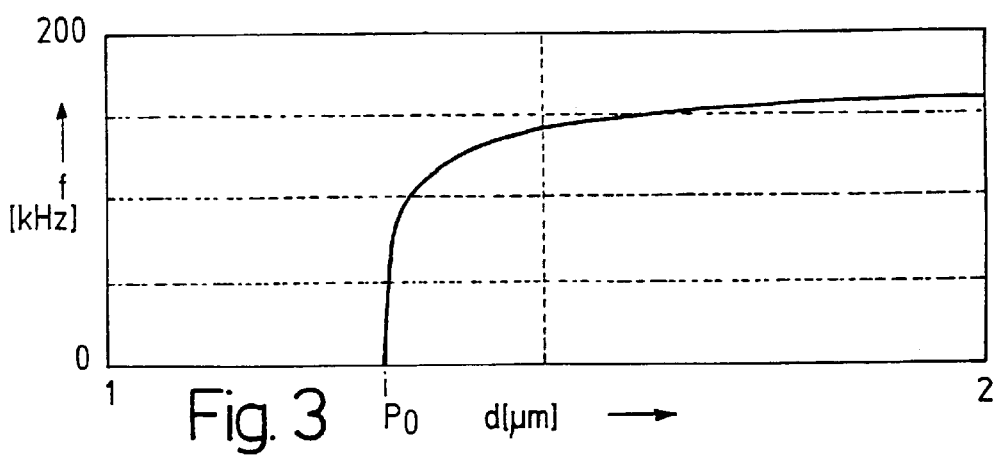
FIG. 3 shows a frequency-spacing characteristic curve of the device according to FIG. 1.

FIG. 3 depicts a resonance frequency-spacing characteristic curve of measuring device 10. It is clear that as spacing d between structure 12 and counterstructure 28 becomes smaller, resonance frequency f drops. Resonance frequency f is limited here on the one hand by resonance frequency $f_0$, which corresponds to the oscillation frequency of structure 12 in the unloaded state, and on the other hand by value 0. Resonance frequency f assumes value 0, when electrostatic force $F_E$ exactly equals the restoring force of bending beam 14, so that the sum of the forces on the bending beam equals 0. Point $P_0$ of mechanical instability of measuring device 10 is at the point where resonance frequency f is equal to 0.

For the actual measuring process, a constant voltage U is applied between structure 12 and counterstructure 28. The greater this voltage U is selected, the closer the operating point of measuring device 10 moves to Point $P_0$ of mechanical instability, and the greater is a shift of resonance frequency f at a given change of spacing d between structure 12 and counterstructure 28. Because of the constant voltage U, electrostatic force $F_E$ is only dependent on spacing d. A change in spacing d corresponds here to a movement along the curve shown in FIG. 3. The closer one comes to point $P_0$ of mechanical instability, the softer structure 12 becomes and the lower resonance frequency f becomes. At the same time, the steepness of the curve and thus the sensitivity with respect to a geometric change in spacing d increases. Here even the slightest geometric shifts suffice to provoke relevant differences of resonance frequency f. The increase in sensitivity of measuring device 10 is only limited here by the fact that structure 12 must itself still oscillate in order to detect a change in resonance frequency f.

The oscillation of structure 12 results in an additional variation of spacing d between structure 12 and counterstructure 28. Thus the smaller the amplitude of the oscillations can be, which depend on the efficiency of drive mechanism 24, the closer the operating point and thus sensitivity can be pushed toward point $P_0$ of mechanical instability. The nonlinearity of the characteristic curve, resulting from the oscillation of structure 12 and from the resulting variation of spacing d, is electronically compensated in an evaluating circuit in a manner not depicted in detail here.

Overall, therefore, it results that a change in resonance frequency f is not effected through a change in the mechanical stresses in structure 12 (bending beam 14). Layer stresses resulting from the mechanical effects on structure 12 thus have no influence on the measurement result, since they only effect a shift in rest frequency (shift in zero point).

According to a concrete embodiment, at a constant voltage U of 18 volts, a length l of 300 μm of structure 12, the following dependency of resonance frequency f on spacing d of structure 12 from counterstructure 28 results. Spacing d is assumed here as a theoretical plate spacing, since, due to electrostatic force $F_E$, the spacing between the rest position, that is the midpoint of oscillation 30, of structure 12 and counterstructure 28 is lower.

Spacing d 1.4 μm 1.5 μm 1.6 μm
Resonance frequency f 125.4 KHz 141.7 KHz 149.7 KHz On the basis of the figures it becomes clear that as spacing d becomes smaller, resonance frequency f drops markedly, and thus changes in resonance frequency f caused by an externally impacting physical variable to be measured result in greater shifts of resonance frequency f.

Figure 4:
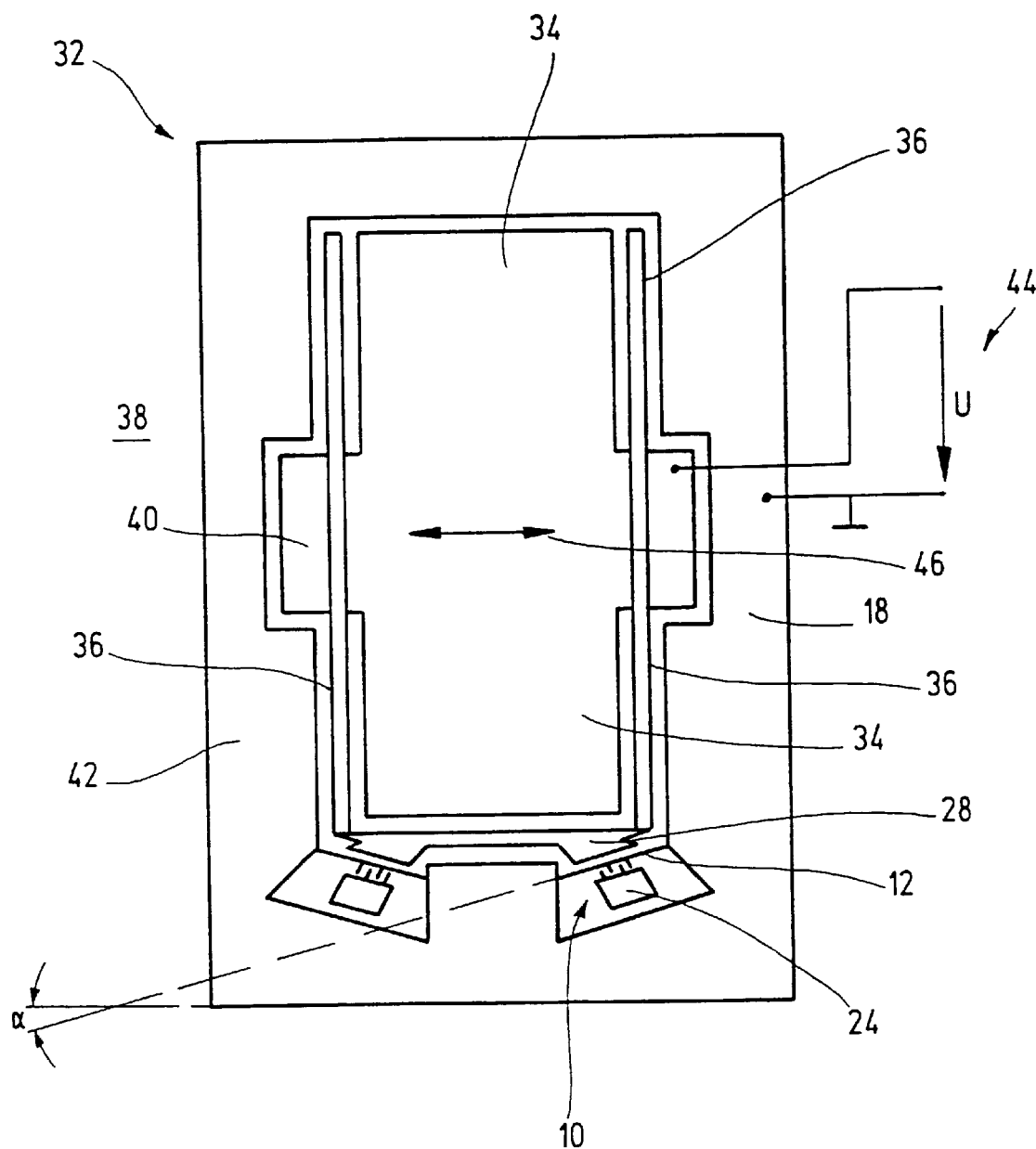
FIG. 4 shows a schematic top view of an acceleration sensor with the measuring device according to the present invention.

FIG. 4 shows a possible form of use of measuring device 10 as a schematic top view. Overall, an accelerator sensor labeled 32 is depicted here. The same parts shown in FIG. 1 are provided with the same reference symbols and are not explained again. Acceleration sensor 32 has a seismic mass 34 which is softly suspended on springs 36 in a planar oscillation plane 38. Springs 36 are also here connected on the one hand with one foot 40 of substrate 42 and on the other hand to seismic mass 34. Springs 36 are also here connected to counterstructure 28. Counterstructure 28 is in turn a component of measuring device 10 (FIG. 1), which further has structure 12 and drive mechanism 24. Counterstructure 28 is coupled to seismic mass 34 through springs 36. Counterstructure 28 is connected to the positive pole of a direct current source 44 through springs 36 and foot 40. Structure 12 is connected through frame 18 or substrate 42 with the negative pole or the ground of direct current source 44. With direct current source 44 turned on, thus voltage U is applied between counterstructure 28 and structure 12. Measuring device 10 is arranged here at an angle α to a sensitivity direction 46 of acceleration sensor 32.

Acceleration sensor 32 shown in FIG. 4 performs the following function:

When used as intended, seismic mass 34 is put, due to an externally impacting acceleration in sensitivity direction 46, in a planar oscillation in the planar oscillation level 38. The acceleration gives rise to a force acting on seismic mass 34 which results in a deflection with a certain amplitude depending on the spring constant of springs 36, on which seismic mass 34 is suspended. Due to the arrangement of springs 36, this deflection is demultiplied through the lifting effect of springs 36, so that counterstructure 28 undergoes a corresponding reduced deflection (change in spacing d).

Depending on angle α at which structure 12 is placed to sensitivity direction 46 of acceleration sensor 32, the deflection is demultiplied one more time, so that finally a deflection of seismic mass 46 results in a much smaller change in spacing d.

As already explained for FIGS. 1 to 3, the change in spacing d with a constant applied voltage U results in a variation of resonance frequency f with which structure 12 is excited by drive mechanism 24. The change in resonance frequency f can be detected by evaluation means not depicted here and determined by a frequency-analog signal, which corresponds to the magnitude of the impacting acceleration.

Due to the oblique positioning of structure 12 at an angle α it is achieved on the one hand that the possibility exists to implement an overload stop for seismic mass 34. Seismic mass 34 can oscillate with an amplitude in its sensitivity direction 46 which is limited by an overload stop not depicted here. Even at maximum amplitude, counterstructure 28 is prevented due to the demultiplication of the deflection through springs 36, as well as through the oblique position at angle α from hitting structure 12.

A further advantage in the arrangement of structure 12 and angle α is to be seen in the fact that a reaction of electrostatic force $F_E$ on counterstructure 28 can be diminished. In this way, only that component of electrostatic force $F_E$ which corresponds to the sine of angle α impacts on the direction of movement of counterstructure 28.

Due to the influencing of resonance frequency f because of the force $F_E$ impacting on structure 12, as explained with reference to the examples, which force $F_E$ is exclusively derived from a change in spacing d, a capacitive measuring method is created with frequency analog analysis which makes it possible to create measuring devices 10 which have a high sensitivity, as well as a simple and sturdy design.

What is claimed is:

1. A method for measuring a physical variable, comprising the steps of:
   oscillating a structure in a particular oscillation direction at a resonant frequency using a drive mechanism;
   providing, to the structure, an additional electrostatic force, the additional electrostatic force being separate from the drive mechanism and acting in a direction substantially parallel to the particular oscillation direction;
   detecting a change in a frequency at which the structure oscillates, the frequency change corresponding to a change in the physical variable to be measured; and
   providing a frequency-analog signal as a function of the frequency change.

2. The method according to claim 1, wherein the additional electrostatic force can be changed.

3. The method according to claim 1, wherein the step of oscillating the structure includes the steps of assigning a counterstructure to the structure, applying a constant voltage between the counterstructure and the structure, and changing a spacing between the structure and the counterstructure.

4. The method according to claim 3, further comprising the step of:
   setting a spacing between an operating point and a point of mechanical instability via a level of the constant voltage.

5. The method according to claim 3, further comprising the step of:
   electronically compensating for a change in the spacing between the structure and the counterstructure as a result of a resonance oscillation of the structure.

6. The method according to claim 3, wherein the spacing between the structure and the counterstructure is changed by an effect of the physical variable to be measured.

7. A device for measuring a physical variable, comprising:
   a structure having a resonant frequency;
   a counterstructure coupled to the structure, the structure and the counterstructure both being connected to a voltage source, the counterstructure providing an electrostatic force that acts on the structure;
   a drive mechanism for oscillating the structure at the resonant frequency, the drive mechanism being separate from the electrostatic force provided by the counterstructure and acting in a direction that is substantially parallel to a direction in which the electrostatic force acts; and
   an evaluation device for detecting an oscillation frequency of the structure, the oscillation frequency of the structure being a function of at least the physical variable.

8. The device according to claim 7, wherein the counterstructure is movably mounted.

9. The device according to claim 7, wherein the voltage source provides a constant voltage.

10. The device according to claim 7, wherein the counterstructure is a movably mounted component in an acceleration sensor.

11. The device according to claim 7, wherein the device is used in an acceleration sensor, and wherein the structure and the counterstructure are arranged such that the structure and the counterstructure form an angle with a sensitivity direction of the acceleration sensor.

* * * * *